United States Patent

Pont et al.

Patent Number: 6,014,170
Date of Patent: Jan. 11, 2000

[54] INFORMATION PROCESSING APPARATUS AND METHOD

[75] Inventors: Steve Pont, Suffolk County, N.Y.; Keita Kimura, Kawasaki, Japan

[73] Assignee: Nikon Corporation, Tokyo, Japan

[21] Appl. No.: 08/879,415

[22] Filed: Jun. 20, 1997

[51] Int. Cl.[7] .................................... H04N 5/76
[52] U.S. Cl. .................. 348/232; 348/231; 386/96; 386/98
[58] Field of Search .................... 348/231, 232, 348/233; 386/95, 98, 125, 126, 96

[56] References Cited

U.S. PATENT DOCUMENTS

| | | | |
|---|---|---|---|
| 5,687,160 | 11/1997 | Aotake et al. | 369/275.3 |
| 5,706,097 | 1/1998 | Schelling et al. | 358/296 |
| 5,754,227 | 5/1998 | Fukuoka | 348/232 |
| 5,761,373 | 6/1998 | Yamamoto | 386/125 |
| 5,813,010 | 9/1998 | Kurano et al. | 707/100 |
| 5,845,046 | 12/1998 | Hirayama et al. | 386/125 |

Primary Examiner—Wendy Garber
Assistant Examiner—Jacqueline Wilson
Attorney, Agent, or Firm—Oliff & Berridge, PLC

[57] ABSTRACT

An information processing apparatus, e.g., a personal computer, requests an electronic camera to send main image data. The main image data sent from the electronic camera is displayed on a CRT display. A transfer request for sub-image data is performed. The sub-image data that is received is superimposed on the main image and displayed on the CRT display. A transfer request of audio data is sent to the electronic camera. The audio data that is received is reproduced. Accordingly, data stored as a recording unit in the electronic camera is always received and displayed by the personal computer in a specified order.

13 Claims, 11 Drawing Sheets

INFORMATION PROCESSING APPARATUS AND METHOD

BACKGROUND OF THE INVENTION

1. Field of the Invention

The present invention relates to information processing apparatus and methods, and more particularly, to an information processing apparatus that is connectable to other electronic units so as to form a system to apply specified processing to main image data, sub-image data, and audio data input from the electronic units, and to an information processing method therefor.

2. Description of Related Art

In a conventional electronic camera, after an image taken of a subject is digitized, the data is compressed by any number of specified methods and then stored in a memory or in a recording medium.

The image stored in the electronic camera can be read into a personal computer. Various types of processing can be applied to the read image by use of many functions provided by the personal computer.

Recently, as a growing number of technologies have advanced, electronic cameras are developing in which, in addition to an image (hereinafter called a main image) of a subject, a sub-image (such as, e.g., a memo superimposed and stored on the image of the subject) and audio information can be recorded along with the main image.

In such an electronic camera, a main image (image of a subject) is handled as main data, and a sub-image and audio data are added to the main data to form a recording unit. Each recording unit is stored in memory.

When information that is stored in a conventional electronic camera in recording units, each of which is formed from multiple types of data, is sent to a personal computer, since the order in which the data is sent is not taken into account, the information is not necessarily reproduced in an appropriate order. For example, if sound is reproduced first, it is difficult in many cases to understand all of the information currently being reproduced based on the sound only. Depending on the audio data, it may take a long time to reproduce the data. In that case, when sound is reproduced first, nothing is shown on the screen for the time while the sound is being reproduced.

SUMMARY OF THE INVENTION

Embodiments of the present invention address the foregoing problem. Accordingly, it is an object of embodiments of the present invention to enable information stored in a device that can record a plurality of information items in addition to a main image, such as an electronic camera, to be read into a personal computer in an appropriate order and to be reproduced in an appropriate order.

In order to achieve the above and other objects, embodiments of the invention relate to an information processing apparatus that is connectable to an electronic device that stores information in recording units, each recording unit including at least one of main image data, sub-image data, and audio data. The apparatus includes detection means (e.g., a controller) for detecting the type of data included in a recording unit to be received from the electronic device, and input means (e.g., an interface) for inputting the data in a specified order (under the control of the controller) according to the type of data detected by the detection means.

The specified order preferably is the order of main image data, followed by sub-image data, followed by audio data.

The electronic device can be an electronic camera that stores information in the recording units, each of which includes at least one of the main image data, the sub-image data and the audio data.

The main image data can be image data, for example, an image of on object photographed by the electronic camera. The sub-image data can be image data that plays an auxiliary role to the main image. For example, the sub-image data can be line-drawing data.

The controller also can control the reproduction of the main image data or the sub-image data, and control the interface to start inputting the audio data after the input main image data or the input sub-image data is reproduced.

In an information processing method according to embodiments of the invention, includes the steps of detecting the type of data included in a recording unit to be received from the electronic device and inputting the data in a specified order according to the detected type of data.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
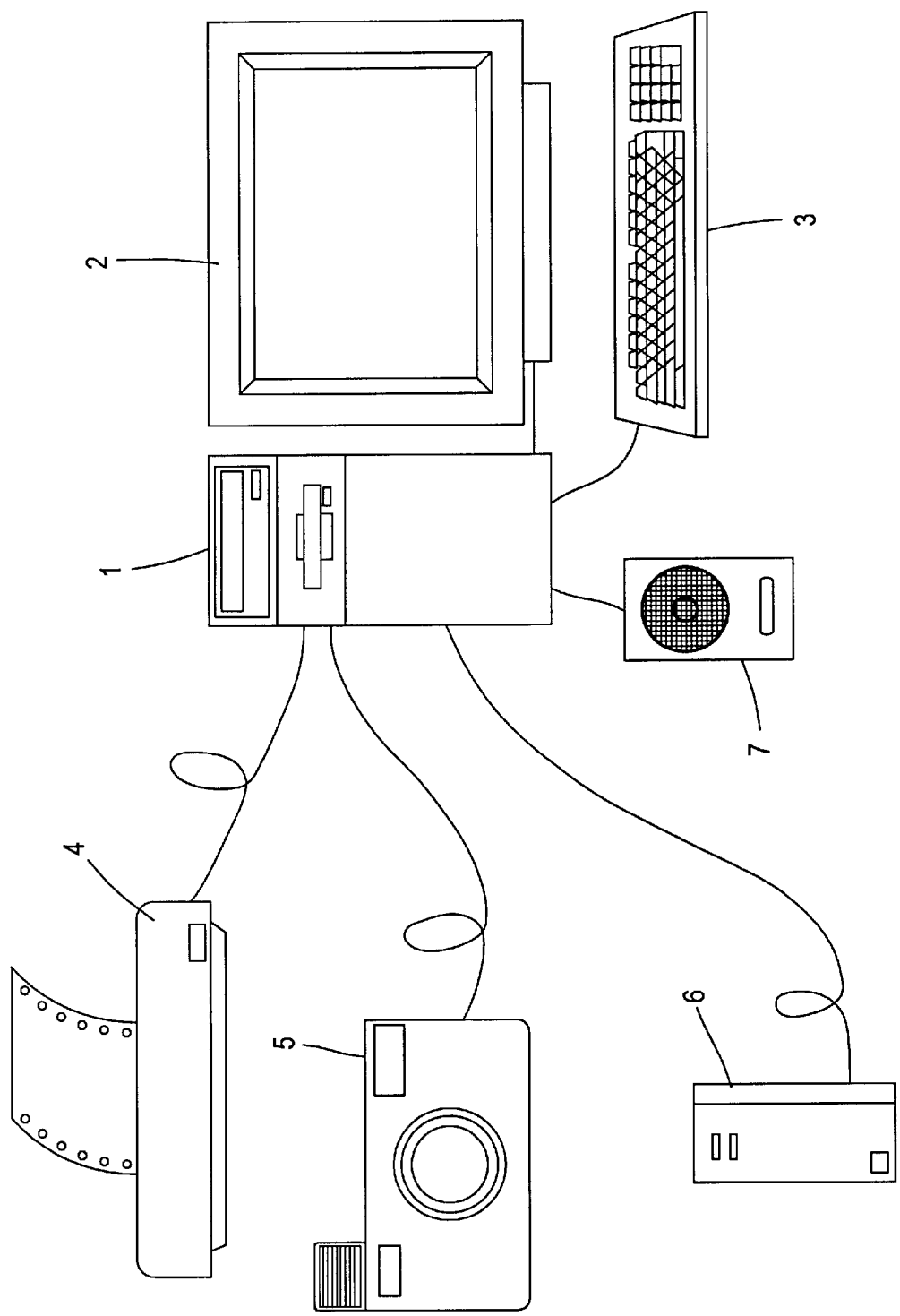
FIG. 1 shows a configuration of an information processing system according to an embodiment of the present invention.

FIG. 1 shows a configuration of an information processing system according to an embodiment of the present invention. In FIG. 1, a personal computer 1, which functions as the information processing apparatus, is connected to a plurality of peripheral units (electronic units) to form an information processing system. Data is input to the personal computer 1 from these peripheral units, and processed data is output from the personal computer 1 to the desired peripheral unit.

A cathode ray tube (CRT) 2 displays an image signal output from the personal computer 1. A keyboard 3 is operated to input information to the personal computer 1. A printer 4 prints text data and image data output from the personal computer 1 on sheets.

An electronic camera 5 compresses a main image, which is an image of a subject, a sub-image such as a memo, which plays an auxiliary role for the main image (e.g., it could describe the main image), and audio information by various respective methods and stores them in memory. Information stored in the electronic camera 5 can be transferred to the personal computer 1 through an input/output port. The electronic camera 5 can be controlled by sending control commands to the camera 5 from the personal computer 1.

A hard disk unit 6 is a large-capacity external storage unit that records information output from the personal computer 1. Recorded information is read according to a request from the personal computer 1.

A speaker 7 receives audio data (digital data) output from the electronic camera 5, applies the specified processing to it, and outputs the corresponding sound. Audio data supplied from the personal computer 1 is converted to an analog signal by a D/A converter built into the speaker 7. The obtained analog signal is amplified by a specified gain by a built-in amplifier and output as sound.

Figure 2:
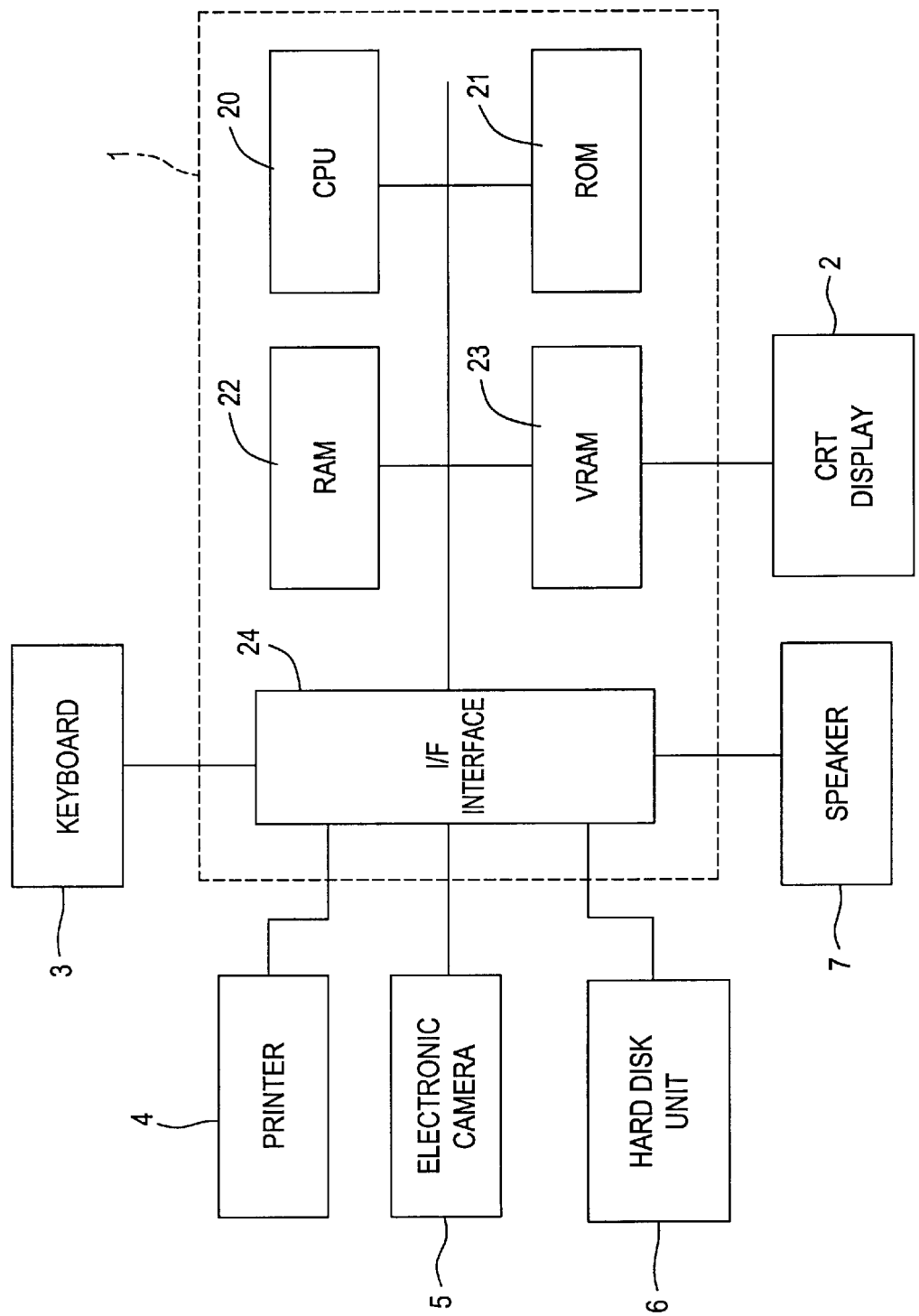
FIG. 2 is a block diagram of the information processing system and includes a detailed configuration of the personal computer shown in FIG. 1.

FIG. 2 is a block diagram showing a more detailed configuration of the personal computer 1 shown in FIG. 1. In FIG. 2, the same symbols used in FIG. 1 are assigned to the same elements as those shown in FIG. 1, and therefore the description thereof will be omitted.

As shown in FIG. 2, the personal computer 1 includes a central processing unit (CPU) 20 that serves as a detection means and as an image-reproduction means, to be described below. Computer 1 also includes a read-only memory (ROM) 21, a random access memory (RAM) 22, a video random access memory (VRAM) 23, and an interface 24 that serves as an input means.

The CPU 20 executes various calculations and controls the whole apparatus. The ROM 21 stores programs such as an initial program loader (IPL). When the power to the personal computer 1 is turned ON, the CPU 20 executes the IPL and loads programs such as an operating system (OS) from the hard disk unit 6.

The RAM 22 temporarily stores data when the CPU 20 executes calculations, and also stores a part of the programs stored in the hard disk unit 6 as they are sequentially read.

The VRAM 23 stores bit-map data in which text data such as characters and graphic data such as figures and images are superimposed. The bit-map data stored in the VRAM 23 is converted into an image signal and output to the CRT display 2.

The interface 24 is connected to peripheral units such as the keyboard 3, the printer 4, the electronic camera 5, the hard disk unit 6, and the speaker 7. The interface 24 converts data formats between those used for the peripheral units and that used for the personal computer 1 so as to allow data to be transferred between the peripheral units and the personal computer 1. The interface 24 is provided with a plurality of input/output ports for connecting to peripheral units, with one port connected to each peripheral unit. The CPU 20 transfers information to and from the peripheral units through these input/output ports.

Figure 3:
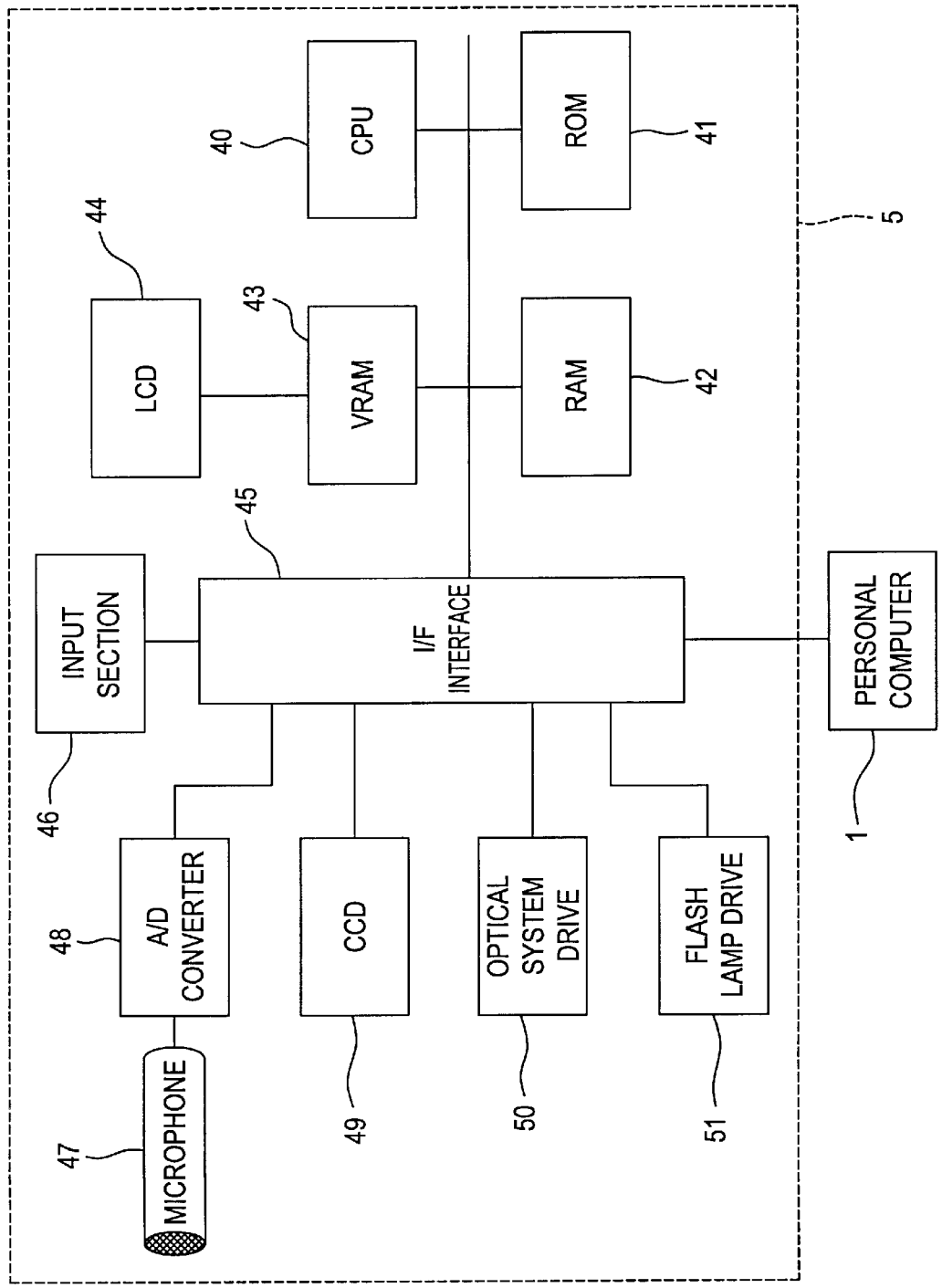
FIG. 3 is a block diagram of the electronic camera shown in FIG. 1.

FIG. 3 is a block diagram showing a detailed configuration of the electronic camera 5 shown in FIG. 1. As shown in FIG. 3, the electronic camera 5 includes a CPU 40, a ROM 41, a RAM 42, a VRAM 43, a liquid crystal display (LCD) 44, an interface 45, an input section 46, a microphone 47, an A/D converter 48, a charge coupled device (CCD) 49, an optical-system drive 50, and a flash-lamp drive 51.

The CPU 40 executes various calculations and controls the whole apparatus. The ROM 41 stores various programs executed by the CPU 40. The RAM 42 stores an image of a subject (a main image), data such as a memo (a sub-image), and audio data. The RAM 42 also temporarily stores data when the CPU 40 executes calculations.

The VRAM 43 stores bit-map data in which text data such as characters and graphic data such as figures and images are superimposed. The bit-map data stored in the VRAM 43 is converted into an image signal and output to the LCD 44. The LCD 44 displays the images corresponding to bit-maps stored in the VRAM 43.

The interface 45 is connected to the input section 46, the A/D converter 48, the CCD 49, the optical-system drive 50, the flash-lamp drive 51, and the personal computer 1, which is an external unit to the camera 5. The CPU 40 controls these units through the interface 45.

The input section 46 includes, e.g., a touch tablet used for inputting memo information and a release button used for taking images.

The microphone 47 converts sound to corresponding electric signals and supplies them to the A/D converter 48. The A/D converter 48 converts the audio signal input from the microphone 47 to a digital signal and supplies it to the interface 45.

The CCD 49 converts an optical image of a subject incident through an optical system (not shown) to the corresponding electric signal (image signal) and outputs the image signal.

The optical-system drive 50, controlled by the CPU 40, controls lenses constituting the optical system (not shown) to perform automatic focusing and automatic zooming, for example.

The flash-lamp drive 51, also controlled by the CPU 40, turns ON and OFF a flash lamp (not shown).

Figure 4:
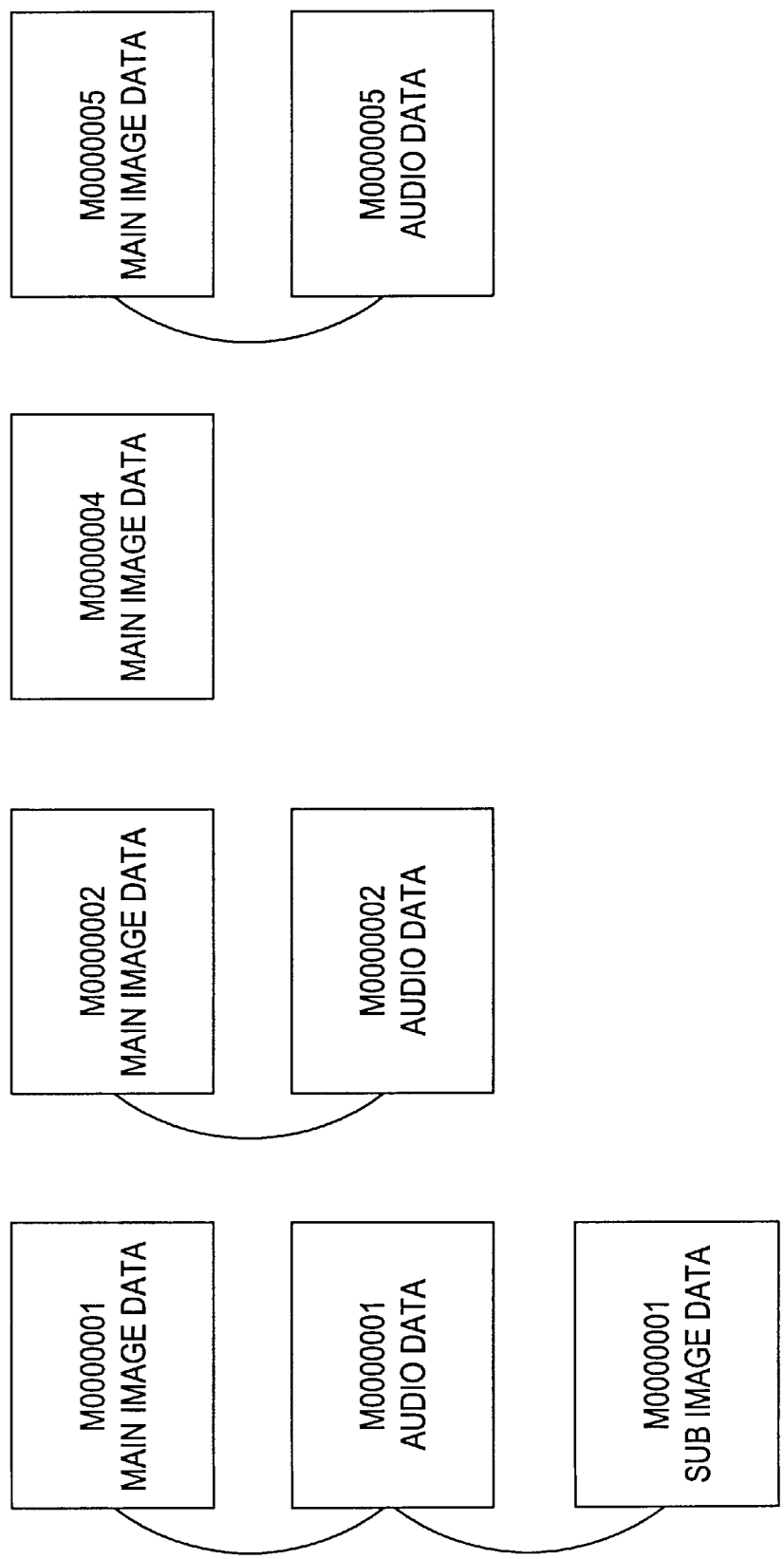
FIG. 4 illustrates data stored in the electronic camera RAM shown in FIG. 3.

FIG. 4 illustrates outlines of storage formats of main image data, sub-image data, and audio data stored in the RAM 42 shown in FIG. 3. As shown in FIG. 4, the same index information (such as M0000001) as for main image data is also assigned to audio data recorded at the same time with the main image data, and/or to sub-image data such as a memo written for the main image data so as to form a mutual relationship among the data.

In FIG. 4, for example, the same index, M0000001, is assigned to the leftmost main image data, the audio data disposed thereunder, and the sub-image data disposed further thereunder. Index M0000002 is assigned to the next main image data to the right and the audio data thereunder.

The next main image data further to the right is not accompanied by audio data or sub-image data. Its index number is M0000004.

The next main image data to the right is accompanied by audio data only. Index M0000005 is assigned to each data.

The index information is formed by the CPU 40 when the main images are taken, and assigned to each data.

Figure 5:
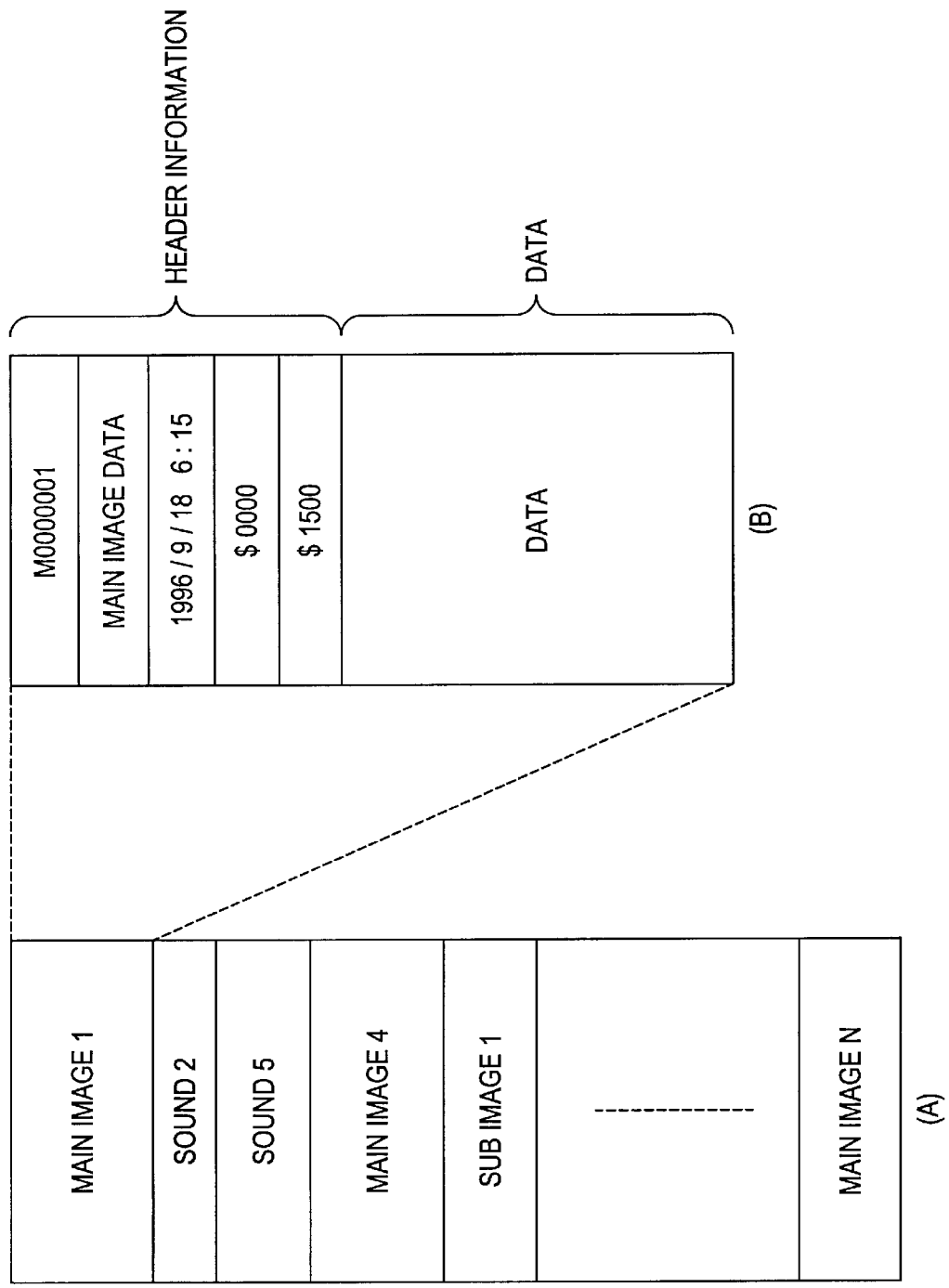
FIG. 5 illustrates how data is stored in the electronic camera RAM shown in FIG. 3.

FIG. 5 illustrates how the above-described data is stored in the RAM 42 shown in FIG. 3.

As shown at (A), main image data, sub-image data, and audio data are stored in the RAM 42 in a mixed form. (B) shows a data structure of a first main image. As shown at (B), main image data includes header information and image data. The header information has the index information described above, information indicating the type of data, information indicating the date when the image was taken, information indicating the start address of an area in which the data is stored, and information indicating the data length of the image data.

In this example, the type of data is main image data and index information M0000001 is assigned thereto. The date when the image was taken is 15 minutes past 6 o'clock on Sep. 18, 1996 (1996/9/18 6:15). The start address of an area in which the image data is stored is $0000 and the data length is $1500. Symbol $ indicates that the following number is noted in hexadecimal format.

The data structure for sub-image data and audio data is the same as that shown at (B) except for the type of data identified in the header.

By referring to the flowchart shown in FIG. 6, an operation of the embodiment shown in FIGS. 2 and 3 will be described.

Figure 6:
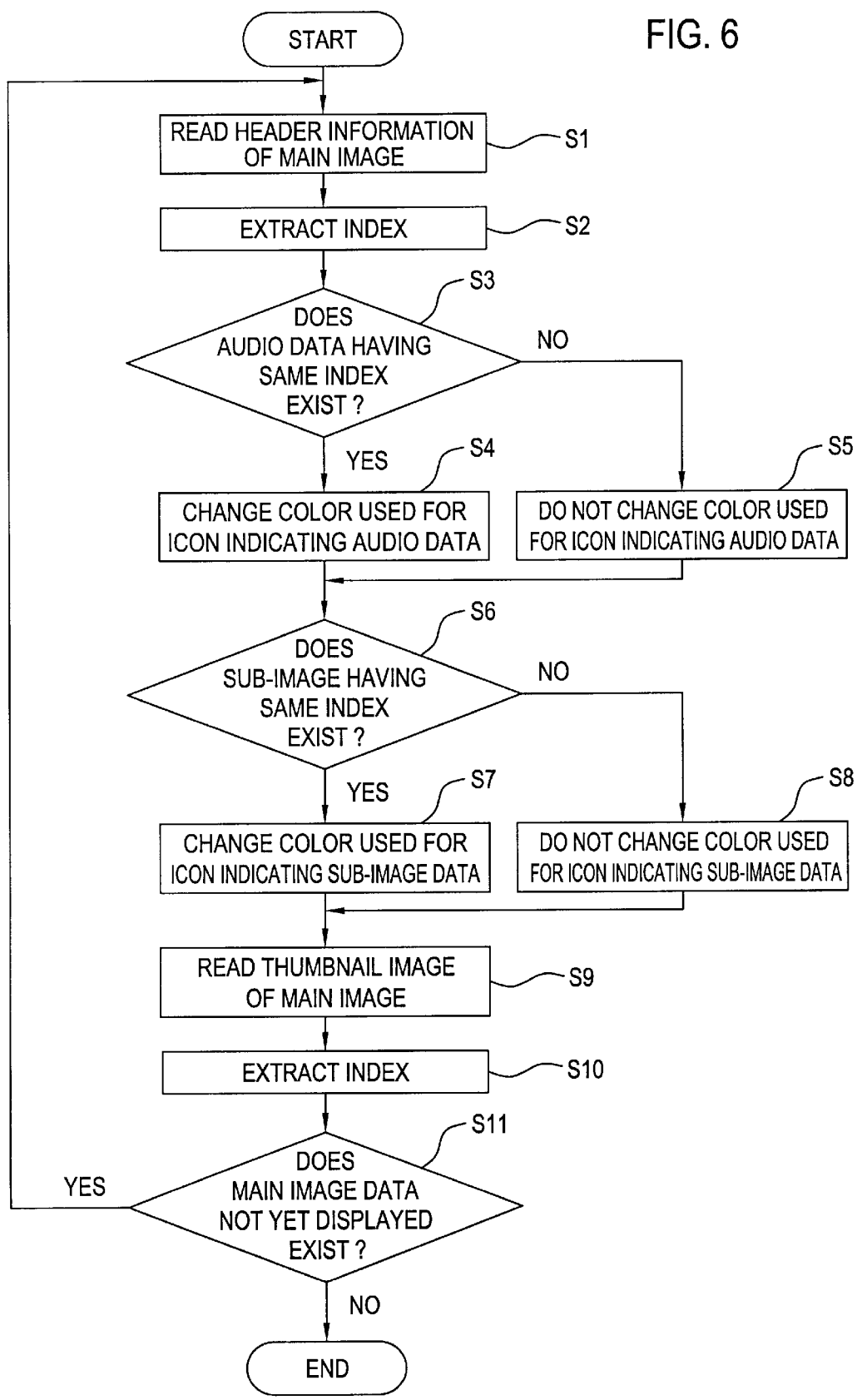
FIG. 6 is a flowchart describing a process executed in the personal computer shown in FIG. 1.

The personal computer 1 shown in FIG. 2 executes a procedure indicated in the flowchart shown in FIG. 6. In step S1, the CPU 20 of the personal computer 1 sends a control command to the electronic camera 5 through the interface 24. The CPU 40 of the electronic camera 5 searches data stored in the RAM 42 for the first main image data and sends its header information to the personal computer 1 through the interface 45. The personal computer 1 obtains the header information of the main image.

In step S2, the CPU 20 of the personal computer 1 extracts an index from the obtained header information of the main image. The procedure then proceeds to step S3.

In step S3, the CPU 20 of the personal computer 1 sends a control command to the electronic camera 5 through the interface 24. The control command requests a search for audio data having the same index as the main image that was just read. The CPU 40 of the electronic camera 5 searches for audio data having the same index as the main image previously sent, according to the received control command, and reports to the personal computer 1 whether such audio data exists.

The CPU 20 of the personal computer 1 receives a signal from the electronic camera 5 and determines whether audio information having the same index as the main image exists. If it is determined that such audio information exists, the procedure then proceeds to step S4. Otherwise, the procedure then proceeds to step S5.

In step S5, the CPU 20 writes the specified data into the VRAM 23 to display an icon indicating audio data on the CRT display in the default color. The procedure then proceeds to step S6.

In step S4, the CPU 20 writes the specified data into the VRAM 23 to display an icon indicating audio data on the CRT display in a color other than the default color. The procedure then proceeds to step S6.

Figure 7:
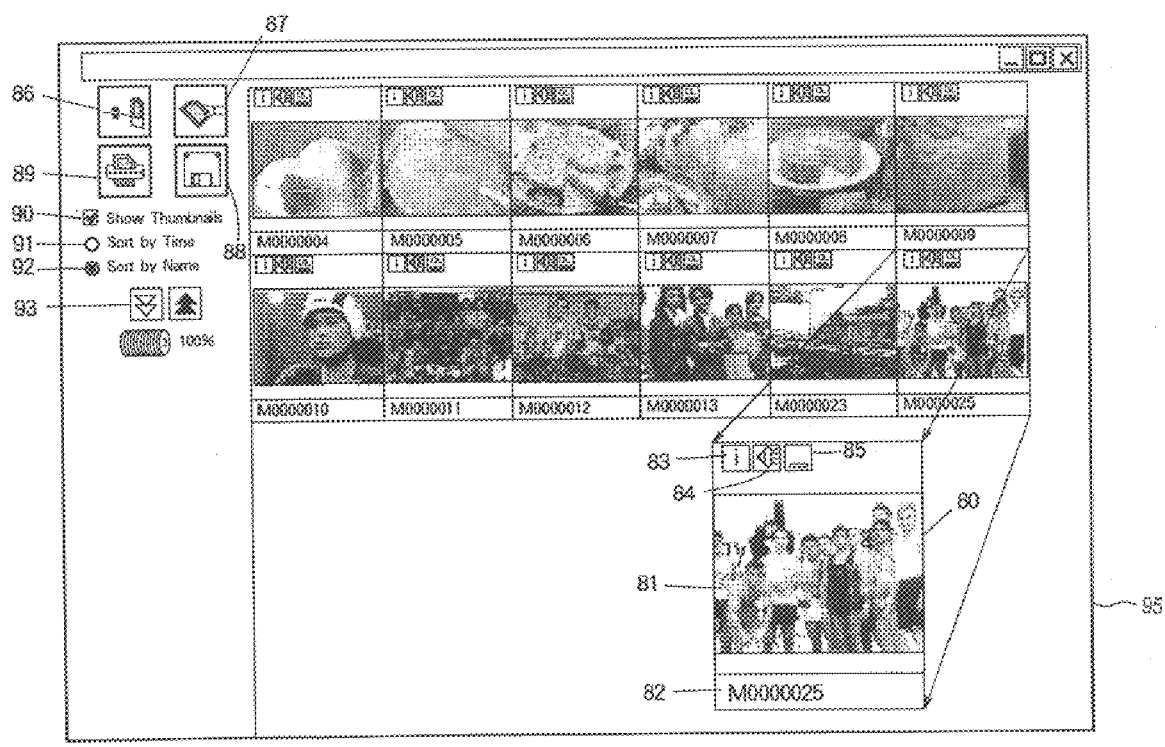
FIG. 7 illustrates a list displayed on a CRT display after performance of the process shown in FIG. 6.

FIG. 7 is a list that is displayed on the CRT display 2 as a result of the process shown in FIG. 6.

In this list, a plurality of (the number of main images stored in the RAM 42 of the electronic camera 5) thumbnail images 81 (described later) made by compressing main images at a specified rate and thumbnail areas which include icons (buttons) indicating whether data other than a main image exists are displayed in a browser window 95.

As indicated in an enlarged view shown in FIG. 7, a thumbnail area 80 includes the thumbnail image 81, an index (M0000025) 82, an information button (button indicating "i") 83, a sound button (button indicating a speaker 84, and an overlay button (button indicating OL) 85.

When the processing in steps S4 or S5 is executed, a new thumbnail area 80 is displayed in the browser window 95 and a sound button 84 is also displayed. In step S4, the sound button 84 is displayed in a color other than the default color, such as green, to indicate that audio information exists. In step S5, the sound button 84 is displayed in the default color, such as black, to indicate that audio information does not exist.

The functions of buttons in the thumbnail area 80 and buttons located at the upper left corner of the browser window 95 will be described later.

Returning to FIG. 6, in step S6, the CPU 20 of the personal computer 1 sends a specified control command to the electronic camera 5 to search for sub-image data having the same index as the main image data in the same way as described above for step S3.

If the CPU 20 of the personal computer 1 determines, according to a response from the electronic camera 5, that sub-image data having the same index exists, the procedure then proceeds to step S7. If it is determined that sub-image data having the same index does not exist, the procedure then proceeds to step S8.

In step S7, the overlay button 85 shown in FIG. 7 is displayed in a color other than the default color, such as green, to indicate that sub-image data exists. In step S8, the overlay button 85 is displayed in the default color, such as black, to indicate that sub-image data does not exist.

In step S9, the CPU 20 of the personal computer 1 sends a control command to have the electronic camera 5 send a thumbnail image. The CPU 40 of the electronic camera 5 compresses the main image data stored in the RAM 42 to generate the thumbnail image and sends it to the personal computer 1 through the interface 45. The personal computer 1 receives the thumbnail image data sent from the electronic camera 5.

In step S10, the CPU 20 of the personal computer 1 writes the received thumbnail image data into the specified area in the VRAM 23. Then, the thumbnail image 81 shown in FIG. 7 is displayed on the CRT display 2.

In step S11, the CPU 20 of the personal computer 1 sends the specified command to the electronic camera to determine whether additional main image data still exits. In other words, the CPU 40 of the electronic camera 5 receives the control command sent from the personal computer 1 and searches the RAM 42 for main image data that is not yet displayed on the CRT display 2. The CPU 40 sends the search results to the personal computer 1 through the interface 45.

The CPU 20 of the personal computer 1 receives the search results and determines whether main image data still exists. When it is determined that main image data still exists, the procedure returns to step S1 to repeat the same process. If it is determined that main image data no longer exists, the process is terminated.

With the above-described process, the CPU 20 functions to detect the type of data included in each recording unit that is to be received from the electronic camera. As shown in FIG. 7, data items having the same index are grouped and displayed on the screen as a list.

The functions of various buttons provided for the browser window 95 shown in FIG. 7 will be briefly described. Four buttons shown in the upper left corner in FIG. 7 indicate, in a clockwise direction, a shutter button 86, a read button 87, a save button 88, and a delete button 89.

The shutter button 86 is used for releasing the shutter of the electronic camera 5. When this button is pressed, the personal computer 1 sends the specified control command to the electronic camera 5. Then, the electronic camera 5 takes an image of a subject on which the camera is currently focused.

The read button 87 is used for reading a full-size image (image not thinned out) from the electronic camera 5.

The save button 88 is used for recording the designated main image and an accompanying sub-image or sound to the hard disk unit 6 shown in FIG. 2.

The delete button 89 is used for deleting data displayed on the designated thumbnail area 80 from the RAM 42 of the electronic camera 5.

"Show Thumbnails" shown thereunder displays thumbnail areas 80 including thumbnail images 81 when a check is made in a square 90 shown to the left of "Show Thumbnails." When a check is not made in the square 90, only the buttons 83 to 85 and the index 82 are displayed.

"Sort by Time" shown thereunder displays thumbnail areas 80 sorted according to the times when the corresponding images were taken when a check is made in a circle 91 shown to the left of "Sort by Time."

"Sort by Name" shown thereunder displays thumbnail areas 80 sorted according to index values when a check is made in a circle 92 shown to the left of "Sort by Name."

Two buttons 93 indicating upward and downward arrows shown further thereunder specify the order in which sorting is performed, namely forward order and reverse order. When "Sort by Time" is selected (a check is made in the square 91 disposed to the left of "Sort by Time"), and the downward arrow button is pressed, data is read from the electronic camera 5 such that older recorded data comes first and the corresponding thumbnail areas are sequentially displayed on the screen from left to right and from top to bottom. When the upward arrow button is pressed, the thumbnail areas 80 are displayed such that newer recorded data comes first.

When "Sort by Name" is selected and the downward arrow button is pressed, thumbnail areas 80 are sequentially displayed on the screen from left to right and from top to bottom such that an area having a smaller index comes first. When the upward arrow button is pressed, the thumbnail areas 80 are displayed such that an area having a larger index comes first.

Figure 8:
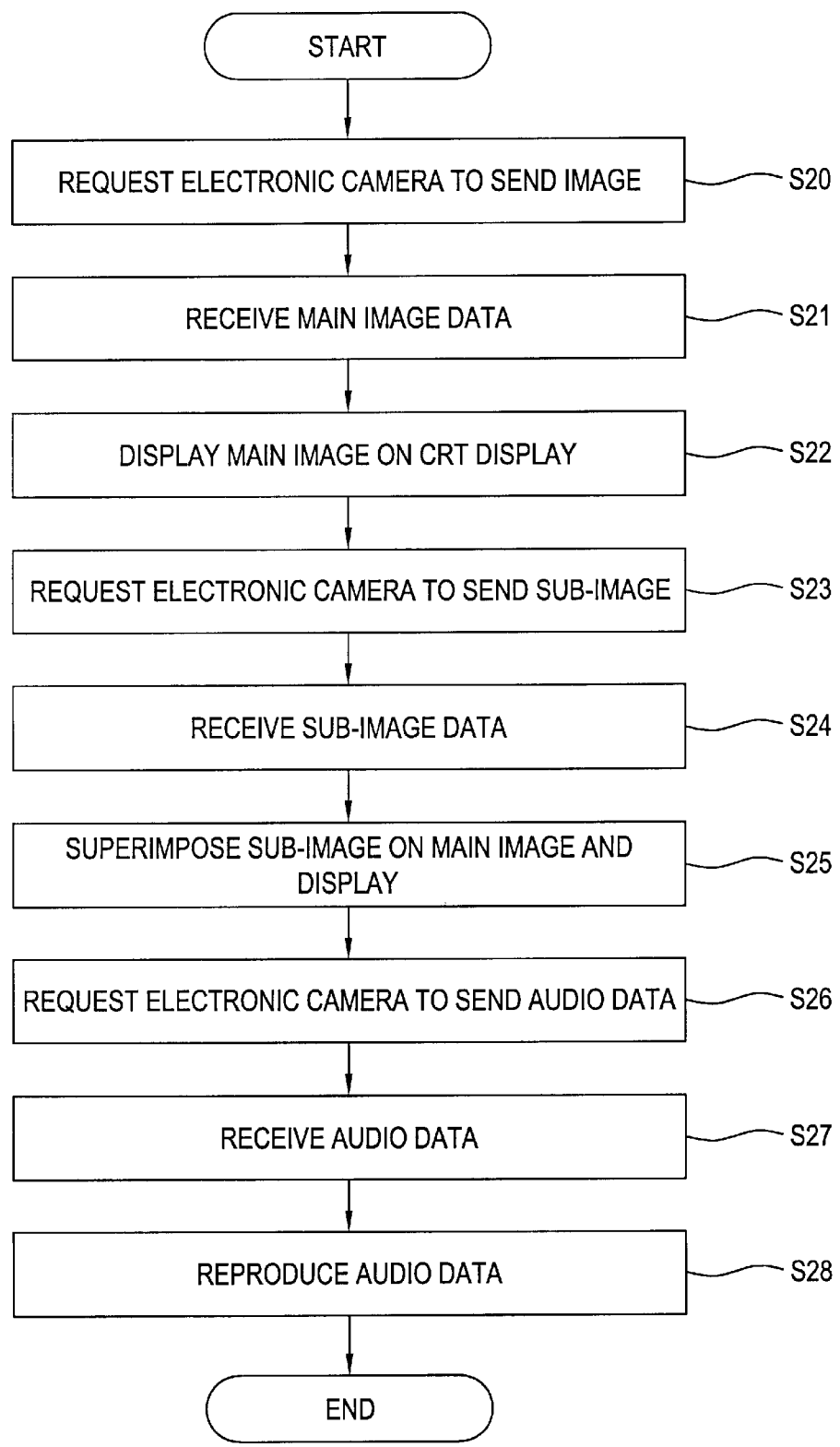
FIG. 8 is a flowchart describing a process executed in the personal computer shown in FIG. 2.

FIG. 8 is a flowchart of a procedure for reproducing a recording unit that includes a main image, a sub-image, and sound.

In step S20, the CPU 20 of the personal computer 1 sends the specified control command to the electronic camera 5 to request a transfer of the main image data included in the specified recording unit. The CPU 40 of the electronic camera 5 receives the control command, reads the specified main image from the RAM 42, and sends it to the personal computer 1.

In step S21, the CPU 20 of the personal computer 1 receives the data sent from the electronic camera 5. The procedure then proceeds to step S22. Expansion processing is applied to the received main image data, and the data is written into the specified area of the VRAM 23. The read main image is displayed on the CRT display 2.

Figure 9:
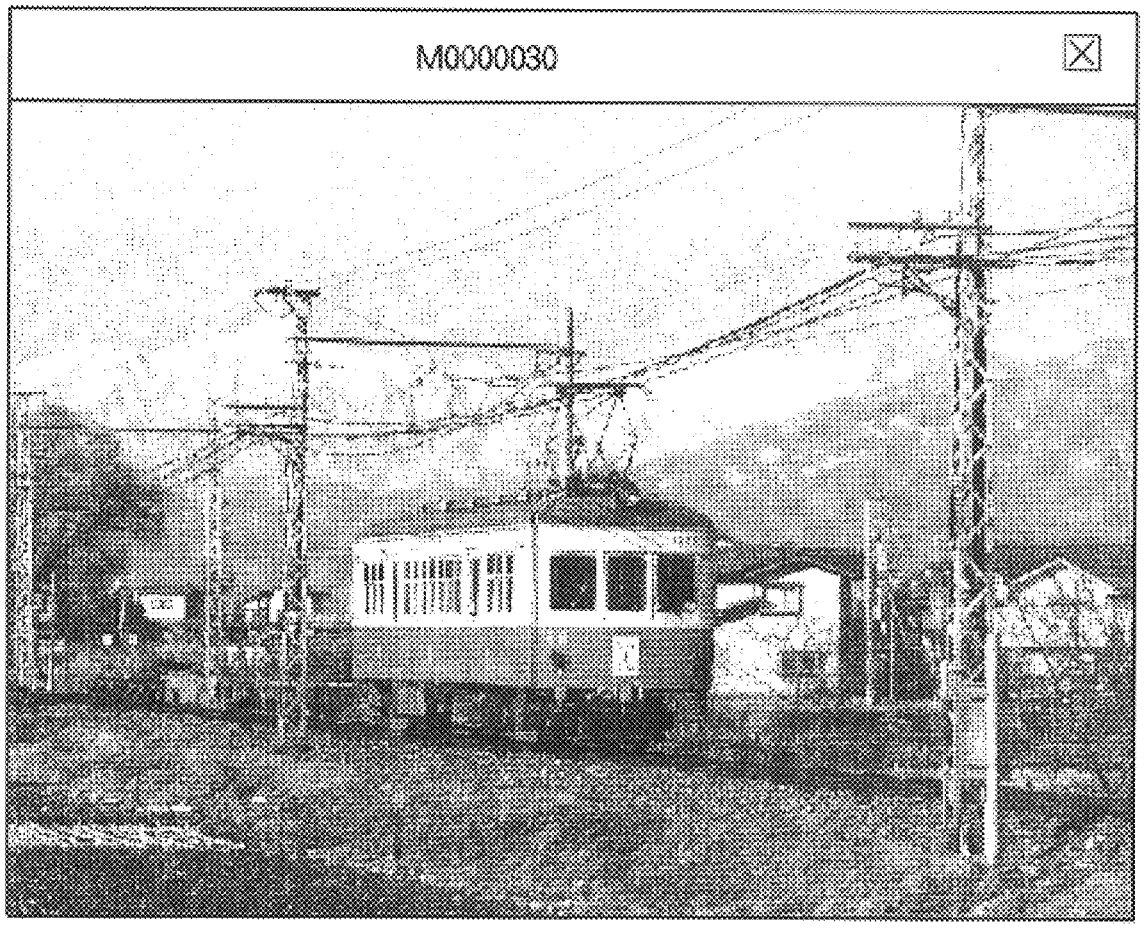
FIG. 9 illustrates a main image displayed on a CRT display by the process shown in FIG. 8.

FIG. 9 is a main image displayed on the CRT display 2 when the processing in step S22 is executed.

In step S23, the CPU 20 of the personal computer 1 sends the specified control command to the electronic camera 5 to request a transfer of the sub-image data included in the desired recording unit. The CPU 40 of the electronic camera 5 receives the control command, reads the specified sub-image data from the RAM 42, and sends it to the personal computer 1.

In step S24, the CPU 20 of the personal computer 1 receives the sub-image data sent from the electronic camera 5. The procedure then proceeds to step S25. The CPU 20 applies expansion processing to the sub-image data and superimposes the obtained data on the main image written in the VRAM 23.

Figure 10:
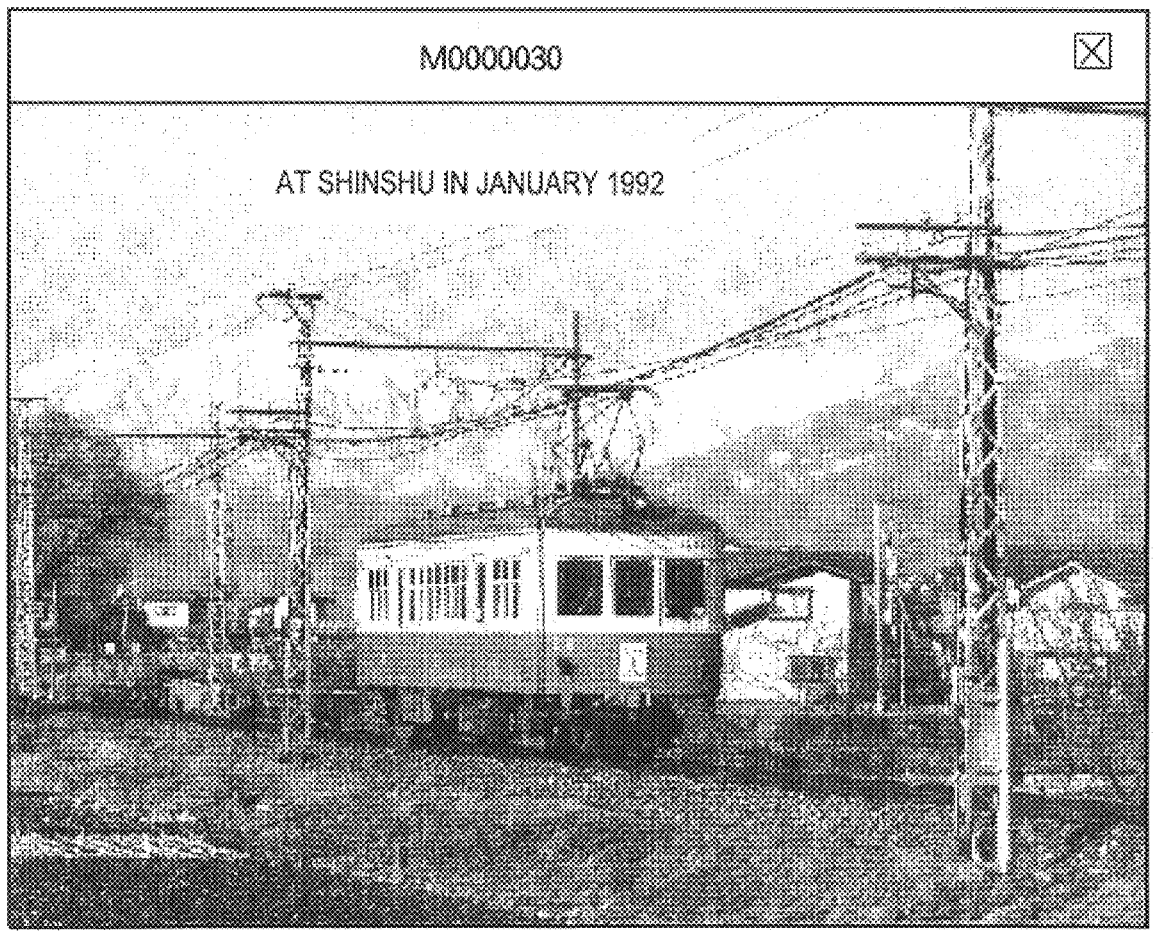
FIG. 10 illustrates a main image and a sub-image displayed on the CRT display by the process shown in FIG. 8.

FIG. 10 is an image displayed on the CRT display 2 when the processing in step S25 is executed. In this image, a sub-image (memo information) of "At Shinshu in Jan. 1992" is superimposed at the top on the main image shown in FIG. 9.

In step S26, the CPU 20 of the personal computer 1 sends a specified command to the electronic camera 5 to request a transfer of the audio data included in the desired recording unit. The CPU 40 of the electronic camera 5 receives the control command, reads the specified audio data from the RAM 42, and sends it to the personal computer 1.

In step S27, the CPU 20 of the personal computer 1 receives the audio data sent from the electronic camera 5. The procedure then proceeds to step S28. The CPU 20 applies expansion processing to the audio data and sends the obtained data to the speaker 7 through the interface 24. The speaker 7 converts the sent digital data into an analog signal by use of a built-in D/A converter, and converts to and outputs as sound by use of a built-in speaker device.

In the image shown in FIG. 10, for example, sound of a train is reproduced.

Accordingly, by performing the process of FIG. 8, the CPU 20 functions to reproduce the main image data, the sub-image data and the audio data in a specified order.

According to the embodiment described above, the main image data is displayed first, the sub-image data is displayed next, and then the audio data is reproduced. With this method, since sound is reproduced after the main and sub-images are displayed, the reproduced information is received visually first, and then aurally. If sound is reproduced first, it is difficult in many cases to understand the entire information currently being reproduced from the sound only. Depending on the audio data, it may take a long time to reproduce the data. In that case, when sound is reproduced first, nothing is shown on the screen for the time while the sound is being reproduced. In the embodiment described above, this condition can be avoided.

Figure 11:
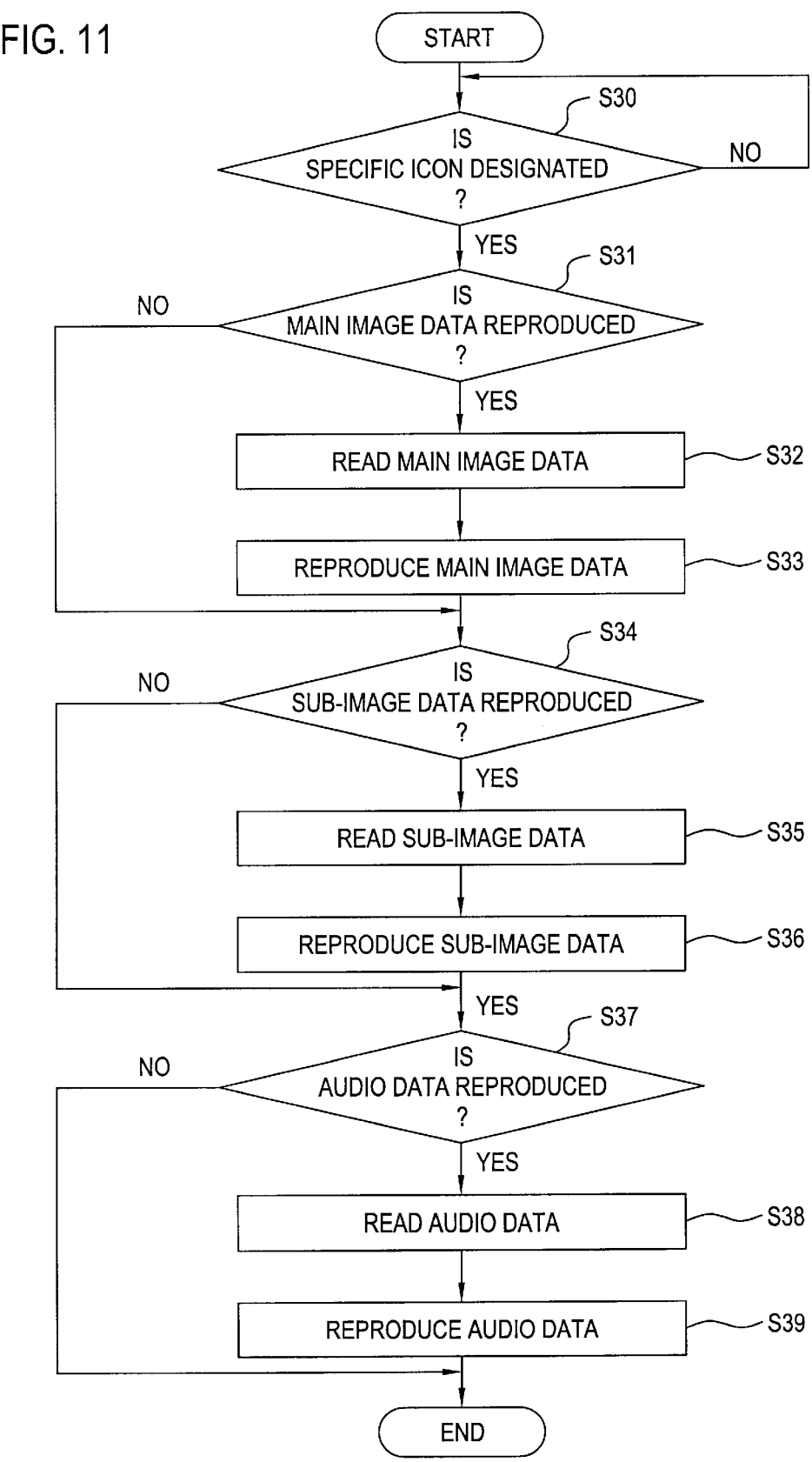
FIG. 11 is a flowchart describing another process executed by the personal computer shown in FIG. 2.

Another embodiment will be described below with respect to FIG. 11, which is a flowchart of another procedure executed in the personal computer 1 shown in FIG. 2.

In step S30, the CPU 20 of the personal computer 1 determines whether a specific thumbnail area 80 (or icon) is designated in the browser window 95 shown in FIG. 7. If it is determined that the specific thumbnail area 80 is designated, the procedure then proceeds to step S31. If it is determined that the specific thumbnail area 80 is not designated, the procedure returns to step S30 and the same processing is repeated.

In step S31, the CPU 20 determines whether the thumbnail area 80 designated in step S30 includes main image data. If it is determined that the thumbnail area 80 does not include main image data, the processing in steps S32 and S33 are skipped and the procedure then proceeds to step S34. If it is determined that main image data is included, the procedure then proceeds to step S32.

In step S32, the CPU 20 of the personal computer 1 sends the specified command to the electronic camera 5 to request a transfer of main image data. The CPU 40 of the electronic camera 5 reads the main image data specified in step S30 from the RAM 42 and sends it to the personal computer 1 through the interface 45.

In step S33, the CPU 20 of the personal computer 1 receives the main image data sent from the electronic camera 5, applies expansion processing, and writes it into the specified area of the VRAM 23. The image shown in FIG. 9, for example, is displayed on the CRT display 2.

In step S34, the CPU 20 of the personal computer 1 determines whether the thumbnail area 80 specified in step S30 includes sub-image data. If it is determined that the thumbnail area 80 does not include sub-image data, the processing in steps S35 and S36 is skipped and the procedure then proceeds to step S37. If it is determined that the thumbnail area 80 includes sub-image data, the procedure then proceeds to step S35.

In step S35, the CPU 20 of the personal computer 1 sends the specified control command to the electronic camera 5 to request a transfer of sub-image data. The CPU 40 of the electronic camera 5 reads the sub-image data specified in step S34 and sends it to the personal computer 1 through the interface 45.

In step S36, the CPU 20 of the personal computer 1 receives the sub-image data sent from the electronic camera 5, applies expansion processing, superimposes the data obtained in expansion processing on the main image data written (if any) into the VRAM 23 in step S33, and writes it into the specified area of the VRAM 23. The image shown in FIG. 10, for example, is displayed on the CRT display 2.

In step S37, the CPU 20 of the personal computer 1 determines whether the thumbnail area 80 specified in step S30 includes audio data. If it is determined that the thumbnail area 80 does not include audio data, the processing is terminated. If it is determined that the thumbnail area 80 includes audio data, the procedure then proceeds to step S38.

In step S38, the CPU 20 of the personal computer 1 sends the specified control command to the electronic camera 5 to request a transfer of audio data. The CPU 40 of the electronic camera 5 reads the audio data specified in step S37 from the RAM 42 and sends it to the personal computer 1 through the interface 45.

In step S39, the CPU 20 of the personal computer 1 receives the audio data sent from the electronic camera 5, applies expansion processing, and sends it to the speaker 7 through the interface 24. The speaker 7 converts the received audio data to an analog signal by use of the built-in D/A converter, and converts to sound by use of the built-in speaker device to output the sound. In the same way as for the foregoing embodiment, sound of a train, for example, is reproduced.

According to the present embodiment, when the desired thumbnail area 80 is selected from the list displayed on the browser window 95, the recorded information included in the selected thumbnail area 80 is reproduced in the order of the main image, the sub-image, and the sound. Therefore, the sound is reproduced with the images (main and sub) included in the designated recording unit being displayed.

According to the embodiments of the information processing apparatus and method described above, since the type of data included in a recording unit to be handled is detected and the data is input in a predetermined, specified order according to the detected type of data, the information of the designated recording unit is checked with the image included in the recording unit, and any audio data can be reproduced thereafter.

While this invention has been described in conjunction with specific embodiments thereof, it is evident that many alternatives, modifications and variations will be apparent to those skilled in the art. Accordingly, the preferred embodiments of the invention set forth herein are intended to be illustrative, not limiting. Various changes may be made without departing from the spirit and scope of the invention as defined in the following claims.

What is claimed is:

1. An information processing apparatus connectable to an electronic device that stores information in recording units, each recording unit including at least one of main still image data, sub-image data, and audio data, the apparatus comprising:

detection means for detecting the type of data included in a recording unit to be received from the electronic device;

input means for inputting the data in a specified order according to the type of data detected by the detection means; and image reproduction means for reproducing the data in the specified order, wherein the input means starts inputting the audio data or the sub-image data that has a relationship with the input main still image data after the input main still image data is reproduced.

2. The information processing apparatus according to claim 1, wherein the specified order is the order of main still image data, followed by sub-image data, followed by audio data.

3. The information processing apparatus according to claim 1, wherein the sub-image data is image data that plays an auxiliary role to the main still image.

4. The information processing apparatus according to claim 1, wherein the sub-image data is line-drawing data.

5. An information processing apparatus connectable to an electronic camera that stores information in recording units, each recording unit including at least one of main still image data, sub-image data, and audio data, the apparatus comprising:

a controller that detects the type of data included in a recording unit to be received from the electronic camera;

an interface through which the data in the recording units are input, the controller controlling the interface to input the data in a specified order according to the type of data detected by the controller; and wherein the controller also controls the reproduction of the data in the specified order, the controller controlling the interface to start inputting the audio data or the sub-image data that has a relationship with the input main still image data after the input main still image data is reproduced.

6. The information processing apparatus according to claim 5, wherein the specified order is the order of main still image data, followed by sub-image data, followed by audio data.

7. The information processing apparatus according to claim 5, wherein the sub-image data is image data that plays an auxiliary role to the main still image.

8. The information processing apparatus according to claim 5, wherein the sub-image data is line-drawing data.

9. The information processing apparatus according to claim 8, wherein the line-drawing data is input to the electronic camera through a touch tablet of the electronic camera.

10. An information processing method for an information processing apparatus connected to an electronic device that stores information in recording units, each of which includes at least one of main still image data, sub-image data and audio data, to form a system, the method comprising the steps of:

detecting the type of data included in a recording unit to be received from the electronic device;

inputting the data in a specified order according to the detected type of data; and reproducing the data in the specified order, wherein input of the audio data or the sub-image data that has a relationship with the input main still image data is started after the input main still image data is reproduced.

11. The information processing method according to claim 10, wherein the specified order is the order of main still image data, followed by sub-image data, followed by audio data.

12. The information processing method according to claim 10, wherein the sub-image data is image data that plays an auxiliary role to the main still image.

13. The information processing method according to claim 10, wherein the sub-image data is line-drawing data.

* * * * *